(12) United States Patent
Segal et al.

(10) Patent No.: US 8,276,077 B2
(45) Date of Patent: Sep. 25, 2012

(54) METHOD AND APPARATUS FOR AUTOMATIC ANNOTATION OF RECORDED PRESENTATIONS

(75) Inventors: Tsakhi Segal, Cupertino, CA (US); Daniel Shimoff, Beit Shemesh (IL); Harel Gruia, Moshav Ganot (IL); Max Romanov, Benai Ayish (IL); Ori Wallenstein, Raanana (IL)

(73) Assignee: The McGraw-Hill Companies, Inc., New York, NY (US)

( * ) Notice: Subject to any disclaimer, the term of this patent is extended or adjusted under 35 U.S.C. 154(b) by 153 days.

(21) Appl. No.: 12/606,058

(22) Filed: Oct. 26, 2009

(65) Prior Publication Data

US 2011/0010628 A1    Jan. 13, 2011

Related U.S. Application Data

(60) Provisional application No. 61/213,755, filed on Jul. 10, 2009.

(51) Int. Cl.
*G06F 3/00* (2006.01)
(52) U.S. Cl. ............................ 715/730; 715/732; 345/2.2
(58) Field of Classification Search .................. 715/730, 715/732; 345/2.2
See application file for complete search history.

(56) References Cited

U.S. PATENT DOCUMENTS

| | | | |
|---|---|---|---|
| 5,528,263 A | 6/1996 | Platzker et al. | |
| 5,583,980 A | 12/1996 | Anderson | |
| 5,936,615 A | 8/1999 | Waters | |
| 6,149,441 A | 11/2000 | Pellegrino et al. | |
| 6,388,654 B1 | 5/2002 | Platzker et al. | |
| 6,470,171 B1 | 10/2002 | Helmick et al. | |
| 6,546,405 B2 | 4/2003 | Gupta et al. | |
| 6,595,781 B2* | 7/2003 | Sutton | 434/276 |
| 6,611,840 B1 | 8/2003 | Baer et al. | |
| 6,636,238 B1 | 10/2003 | Amir et al. | |
| 6,646,655 B1* | 11/2003 | Brandt et al. | 715/723 |
| 6,665,835 B1 | 12/2003 | Gutfreund et al. | |
| 6,728,753 B1* | 4/2004 | Parasnis et al. | 709/203 |

(Continued)

FOREIGN PATENT DOCUMENTS

WO    WO 00/58933 A1    10/2000

OTHER PUBLICATIONS http://www.tegrity.com/nr_newpr.html Tegrity—News and Events, News Release "Tegrity Adds New Products for Educators' Mobility and Flexiblity," San Jose, CA (Oct. 28, 1998), 2 pages.

(Continued)

*Primary Examiner* — Doon Chow
*Assistant Examiner* — Linh K Pham
(74) *Attorney, Agent, or Firm* — Rothwell, Figg, Ernst & Manbeck p.c.

(57) ABSTRACT

Automatic annotation of recorded lectures includes the annotation of recorded presentations as presented on a computer screen during a presentation. Such annotation is accomplished with metadata that indicates the original slide and the time in the presentation that the slide was presented. Registration of the presentation tags the presentation with this metadata, which uniquely identifies the presentation and each slide. The metadata enables future searching of the recorded presentation for the annotation, such that segments of recorded presentations in which the slide was presented can be recalled. The searching function can also be used in an integrated system with other applications to enable recall of segments of relevant recorded presentations.

12 Claims, 6 Drawing Sheets

U.S. PATENT DOCUMENTS

| | | |
|---|---|---|
| 6,760,749 B1 | 7/2004 | Dunlap et al. |
| 6,789,228 B1 | 9/2004 | Merril et al. |
| 6,871,043 B2 | 3/2005 | Sanda |
| 6,965,752 B2 | 11/2005 | Allen et al. |
| 6,968,506 B2 | 11/2005 | Yacovone et al. |
| 6,988,138 B1 | 1/2006 | Alcorn et al. |
| 7,047,279 B1 | 5/2006 | Beams et al. |
| 7,051,275 B2 | 5/2006 | Gupta et al. |
| 7,099,798 B2 | 8/2006 | Yu et al. |
| 7,167,191 B2 | 1/2007 | Hull et al. |
| 7,289,985 B2 | 10/2007 | Zeng et al. |
| 7,296,218 B2 | 11/2007 | Dittrich |
| 7,330,875 B1* | 2/2008 | Parasnis et al. ............... 709/204 |
| 7,340,481 B1 | 3/2008 | Baer et al. |
| 7,346,844 B1 | 3/2008 | Baer et al. |
| 7,356,763 B2 | 4/2008 | Lin et al. |
| 7,356,766 B1 | 4/2008 | Baer et al. |
| 7,383,344 B2 | 6/2008 | Hunter |
| 7,383,495 B2 | 6/2008 | Dontcheva et al. |
| 7,401,097 B1 | 7/2008 | Baer et al. |
| 7,512,627 B2 | 3/2009 | Hossfeld et al. |
| 7,512,883 B2* | 3/2009 | Wallick et al. ............... 715/717 |
| 7,552,228 B2* | 6/2009 | Parasnis et al. ............... 709/231 |
| 7,640,502 B2* | 12/2009 | Xu et al. ...................... 715/730 |
| 7,643,705 B1* | 1/2010 | Erol et al. ..................... 382/305 |
| 7,653,925 B2 | 1/2010 | Hull et al. |
| 7,689,898 B2 | 3/2010 | Merril et al. |
| 7,698,645 B2* | 4/2010 | Fuse ............................ 715/730 |
| 7,733,366 B2* | 6/2010 | Beavers et al. ........... 348/14.08 |
| 8,024,672 B1* | 9/2011 | Skwarecki et al. ........... 715/854 |
| 8,151,179 B1* | 4/2012 | Raman et al. ................. 715/203 |
| 2002/0026521 A1* | 2/2002 | Sharfman et al. ............ 709/231 |
| 2002/0099552 A1* | 7/2002 | Rubin et al. .................. 704/270 |
| 2002/0109712 A1* | 8/2002 | Yacovone et al. ............. 345/732 |
| 2002/0140724 A1* | 10/2002 | Qureshi et al. ................ 345/730 |
| 2002/0191013 A1* | 12/2002 | Abrams ........................ 345/730 |
| 2003/0236792 A1* | 12/2003 | Mangerie et al. ............. 707/100 |
| 2004/0002049 A1* | 1/2004 | Beavers et al. ............... 434/350 |
| 2004/0078805 A1 | 4/2004 | Brian et al. |
| 2004/0143603 A1* | 7/2004 | Kaufmann et al. ........ 707/104.1 |
| 2004/0205477 A1* | 10/2004 | Lin ............................ 715/500.1 |
| 2005/0044499 A1* | 2/2005 | Allen et al. ................... 715/704 |
| 2005/0125717 A1 | 6/2005 | Segal et al. |
| 2005/0262201 A1* | 11/2005 | Rudolph et al. .............. 709/205 |
| 2005/0289453 A1 | 12/2005 | Segal et al. |
| 2006/0005136 A1* | 1/2006 | Wallick et al. ................ 715/726 |
| 2006/0010472 A1 | 1/2006 | Godeny |
| 2006/0235927 A1 | 10/2006 | Bhakta et al. |
| 2007/0033528 A1* | 2/2007 | Merril et al. .................. 715/732 |
| 2007/0156653 A1 | 7/2007 | Garg |
| 2008/0034400 A1 | 2/2008 | Allen et al. |
| 2008/0176202 A1* | 7/2008 | Agnihotri et al. ............ 434/322 |
| 2009/0049077 A1* | 2/2009 | Lawlor ......................... 707/102 |
| 2009/0098524 A1* | 4/2009 | Walton ......................... 434/350 |
| 2009/0172550 A1* | 7/2009 | Dantec et al. ................. 715/732 |
| 2009/0172714 A1 | 7/2009 | Gruia et al. |

OTHER PUBLICATIONS http://www.tegrity.com/nr_blackboard.html Tegrity—News and Events, Press Release "Blackboard and Tegrity Give Teachers the Power to Add multimedia Recordings of Live Classroom Lectures to Their Online Courses" Washington, D.C. (Feb. 8, 2000), 2 pages.

* cited by examiner

| Lecture L1 | |
|---|---|
| $UID_2$ | 00:00:00 |
| $UID_3$ | 00:01:15 |
| $UID_2$ | 00:02:35 |
| $UID_4$ | 00:03:25 |
| $UID_5$ | 00:04:10 |

| Lecture L2 | |
|---|---|
| $UID_1$ | 00:00:00 |
| $UID_2$ | 00:01:00 |
| $UID_3$ | 00:02:20 |
| $UID_{18}$ | 00:03:50 |

METHOD AND APPARATUS FOR AUTOMATIC ANNOTATION OF RECORDED PRESENTATIONS

CROSS REFERENCE TO RELATED APPLICATIONS

This application claims priority to U.S. provisional patent application Ser. No. 61/213,755, filed Jul. 10, 2009, and which application is incorporated herein in its entirety by this reference thereto.

BACKGROUND OF THE INVENTION

1. Technical Field

The invention relates to presentations. More specifically, the invention relates to the automatic annotation of recorded presentations.

2. Description of the Prior Art

Presentations are commonly delivered as a sequence of slides presented on a computer screen. These presentations may be recorded for playback as video and audio electronic content, such as in teaching applications or computer-assisted learning applications. In certain cases, a lecture is recorded showing the slides that are presented by the lecturer. This is beneficial for students who want to review a lecture.

Electronic content, such as documents, audio, or video, is often indexed for searching and retrieval. Additionally, the content may be enhanced by tagging it with metadata. This metadata enriches the search functionality, enabling users to search for content based on the metadata. Users of the content can search for the content using metadata terms, such as keywords. Metadata may be authored and added to the electronic content manually. Because the authoring of relevant metadata is a time-consuming process, metadata may also be collected automatically through knowledge management systems.

In multimedia content, such as audio or video content, user-authored annotations and metadata may be temporally synchronized to the content. This metadata is linked to specific time segments of the content. Searching multimedia for such time-synchronized metadata allows the retrieval of specific segments of content. The annotations or metadata may be retrieved and viewed together with the specific time segment of content.

Time-synchronized annotations may be used with recorded presentations to enable time-synchronized capture and review of user-authored notes associated with the presentation. This enables time-synchronized review of recorded lectures and course, with synchronized playback of the recorded notes. Time-synchronized metadata may be used to synchronize a recorded presentation or lecture with a set of source slides. A supplemental metadata file synchronizes the multimedia sources, such as the video of a presentation, with a slide set.

Unfortunately, providing manually authored time-synchronized annotations of the recordings to indicate the source slides in a recorded presentation requires considerable user effort and is a very time-consuming process.

SUMMARY OF THE INVENTION

An embodiment of the invention provides a method and apparatus that generates metadata automatically, and that allows the association of time-synchronized annotations along with recorded presentations and with the original source slides. Embodiments of the invention provide for such a solution to work equally well for multiple recorded presentations derived from the same source slide set. Embodiments of the invention also provide for such a solution to enable searching of the recorded presentations based on the original source slides.

A presently preferred embodiment of the invention provides a method and apparatus for automatic annotation of recorded lectures. One embodiment includes the annotation of recorded presentations, as presented on a computer screen during a presentation, with metadata indicating the original slide and the time in the presentation that the slide was presented. Registration of the presentation tags the presentation with metadata, which uniquely identifies the presentation and each slide. The metadata enables future searching of the recorded presentation for the annotation, such that segments of recorded presentations in which the slide was presented can be recalled. The searching function can be used in an integrated system with other applications to enable recall of segments of relevant recorded presentations.

DETAILED DESCRIPTION OF THE INVENTION

An embodiment of the invention provides a method and apparatus for automatic annotation of recorded lectures. Embodiments of the invention allow the annotation of recorded presentations as presented on a computer screen during a presentation, in which metadata indicates the original slide and the time in the presentation that the slide was presented. Registration of the presentation tags the presentation with metadata, which uniquely identifies the presentation and each slide. The metadata enables future searching of the recorded presentation for the annotation, such that segments of recorded presentations in which the slide was presented can be recalled. The searching function can be used in an integrated system with other applications to allow the recall of segments of relevant recorded presentations.

Figure 1:
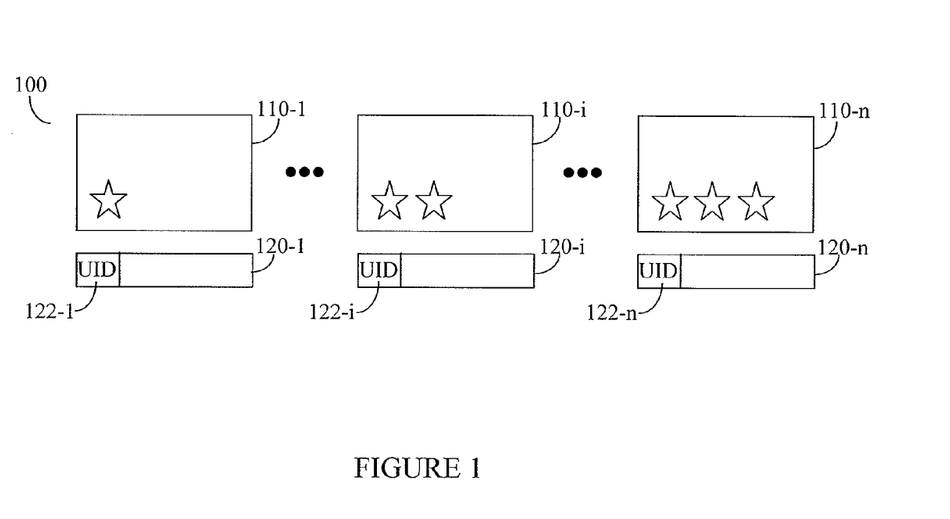
FIG. 1 is schematic diagram of a presentation showing a sequence of slides, where each slide has a unique identification (UID) according to the invention.

In an embodiment of the invention, a publisher of a textbook provides a version of at least a portion of the textbook or material that is related to the textbook topic in the form of a presentation on tangible media that is readable by a computer. The presentation also contains one or more slides, also referred to herein as foils. Each slide may be used by a lecturer when the lecturer discusses a respective topic covered by the text book. FIG. 1 is a schematic diagram showing an exemplary presentation 100, also referred to herein as a foil deck or slide deck, comprising a sequence of slides 110, where each slide has a unique identification (UID) 122. A slide, for example slide 110-*i*, provides the viewable information of the slide. This may include not only the portion of the slide that is viewable by the lecturer and the students, but may also include footnotes that may be used by the lecturer in the course of presenting the specific slide. The slides 110 may be shown in any sequence as desired by the lecturer, which is often the case. Each slide has a UID that uniquely identifies the slide relative to any other slide. The UID is coded as part of the metadata of the slide, for example, metadata 120-*i* for slide 110-*i*. Each metadata 120 comprises various types of information including, but not limited to, the UID. For example, the UID 122-*i* is the unique identification of the slide 110-*i*, and is registered by the presentation system whenever the slide is shown, as explained in greater detail below. The presentation may be stored in tangible computer readable medium that includes, but is not limited to, a computer memory, computer disk, remote memory, networked attached storage (NAS), remote memory, compact disk (CD), digital video disk (DVD), disk-on-key, read only memory (ROM), non-volatile memory (NVM), and the like.

Figure 2:
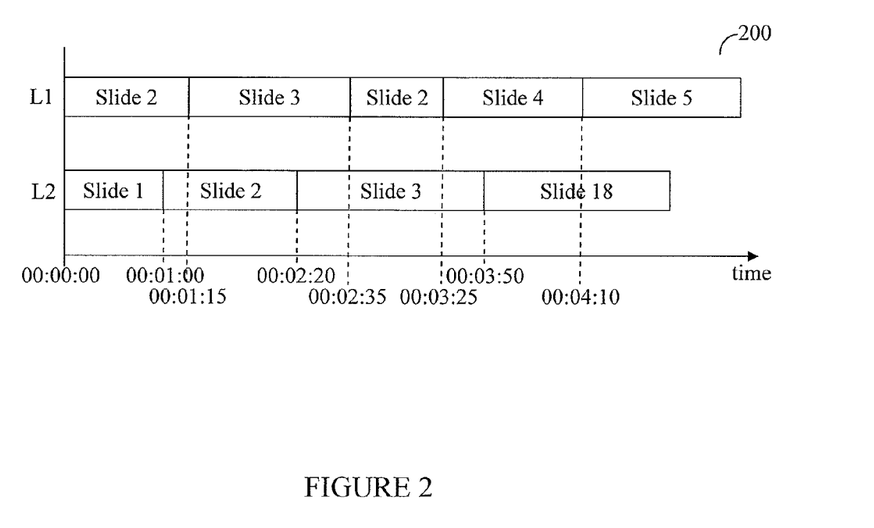
FIG. 2 is a schematic diagram of a time line for a presentation, in which different sequences of slides are used to make the presentation according to the invention.
Figure 3:
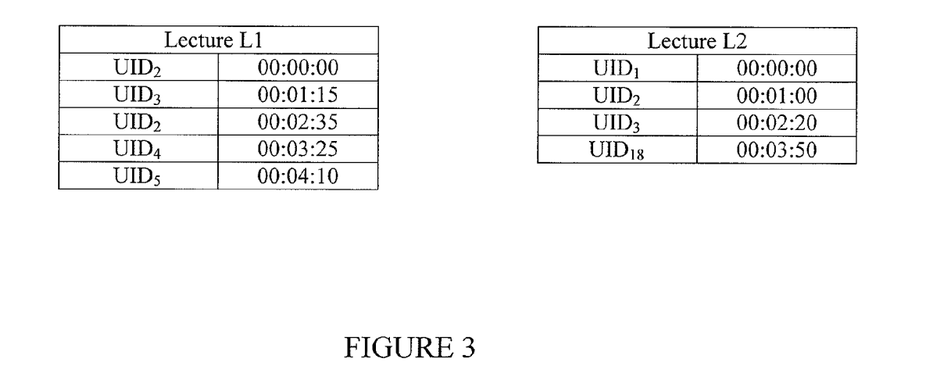
FIG. 3 a schematic diagram showing a sequence of UIDs and times for lecture L1 and a sequence of UIDs and times for lecture L2 according to the invention.

As noted above, different lecturers who use the same presentation may show the presentation in different sequences of slides that best fit their individual presentation style. FIG. 2 is a schematic timeline 200 of a presentation, in which different sequences of slides are used by different lecturers according to the invention. The lecturer making lecture L1 shows the presentation in the following sequence: slide 2, slide 3, slide 2, slide 4, slide 5. The lecturer making lecture L2 uses the same presentation in a different order: slide 1, slide 2, slide 3, slide 18. According to the invention, as the slides are presented, the computerized system (FIG. 6) registers in memory for each lecture L1 and L2, the respective sequence of UIDs of the slides used, as well as the relative time from the beginning of the lecture when the slide is shown. A sequence in memory for lectures L1 and L2 is shown in FIG. 3. The sequence recorded allows the presentation of the same sequence of slides to a user of the system, for example a student, when accessing the lecture in real-time, i.e. as the lecture takes place, or when accessing the lecture at another time for the purpose of, for example, working on the student's homework or studying for a test.

Figure 4:
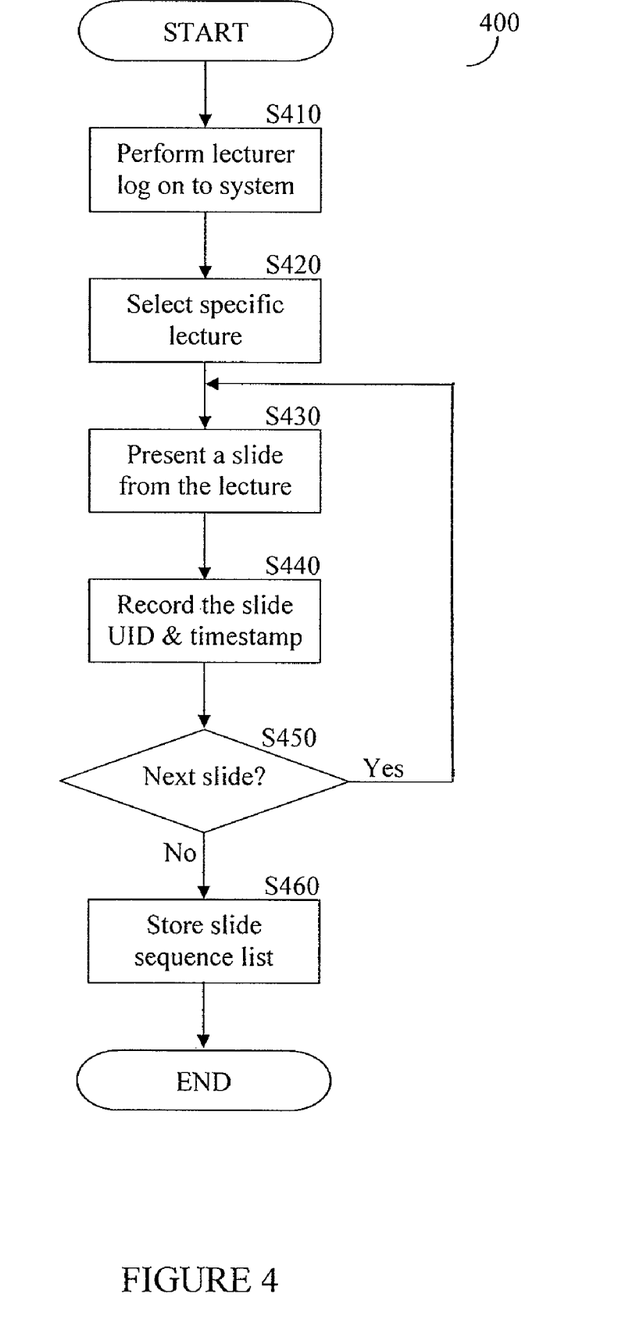
FIG. 4 is a flowchart showing the registration of a sequence of slides as presented by a lecturer during a presentation according to the invention.

FIG. 4 is a flow chart 400 that shows the registration of a sequence of slides as presented by a lecturer during a presentation.

In step S410, the lecturer logs-on to the system, which is enabled to register the sequence of slides presented in accordance with the invention.

In step S420, the specific lecture, e.g. lecture L1, is selected from, for example, a list of possible lectures that the lecturer plans to make. In another embodiment, the lecturer determines which lecture is to be presented, for example lecture L1.

In step S430, the system presents a slide, as selected by the lecturer, from the tangible computer readable medium on which the presentation is present, for example a slide from the lecture L1. In one embodiment, the lecturer determines the sequence of the slides to be presented and only those slides are presented in the sequence predetermined by the lecturer.

In step S440, the system registers the slide UID and the time stamp of the starting time of the current presentation of the slide.

In step S450, the system checks whether a following slide is to be presented and, if so, execution continues with step S430; otherwise, execution continues with step S460, where the sequence of slides presentation, for example the sequence shown with respect to lecture L1 shown in FIG. 3, is stored in memory of the system. Thereafter, execution terminates.

As a result, a sequence is stored in memory that enables the recreation of the slide show in exactly the same sequence as presented by the lecturer. It further enables the use of a single presentation, regardless of the number of lecturers using the presentation or the specific sequence the lecturers choose to present the presentation. When a viewer, for example a student, wishes to view the presentation the specific sequence that is unique to the lecturer in the class to which the student is registered is presented. In addition, an audio track of the presentation may be used, providing the student with the correct sequence of the presentation slides, as well as an audio recording of the accompanying lecture. In another embodiment, a video track of the presentation is also provided. Although the slides may be seen in a video recording, it is advantageous to have the sequence of slides available because the display of the specific slides is usually clearer when a full screen display of the slide is available.

Figure 5:
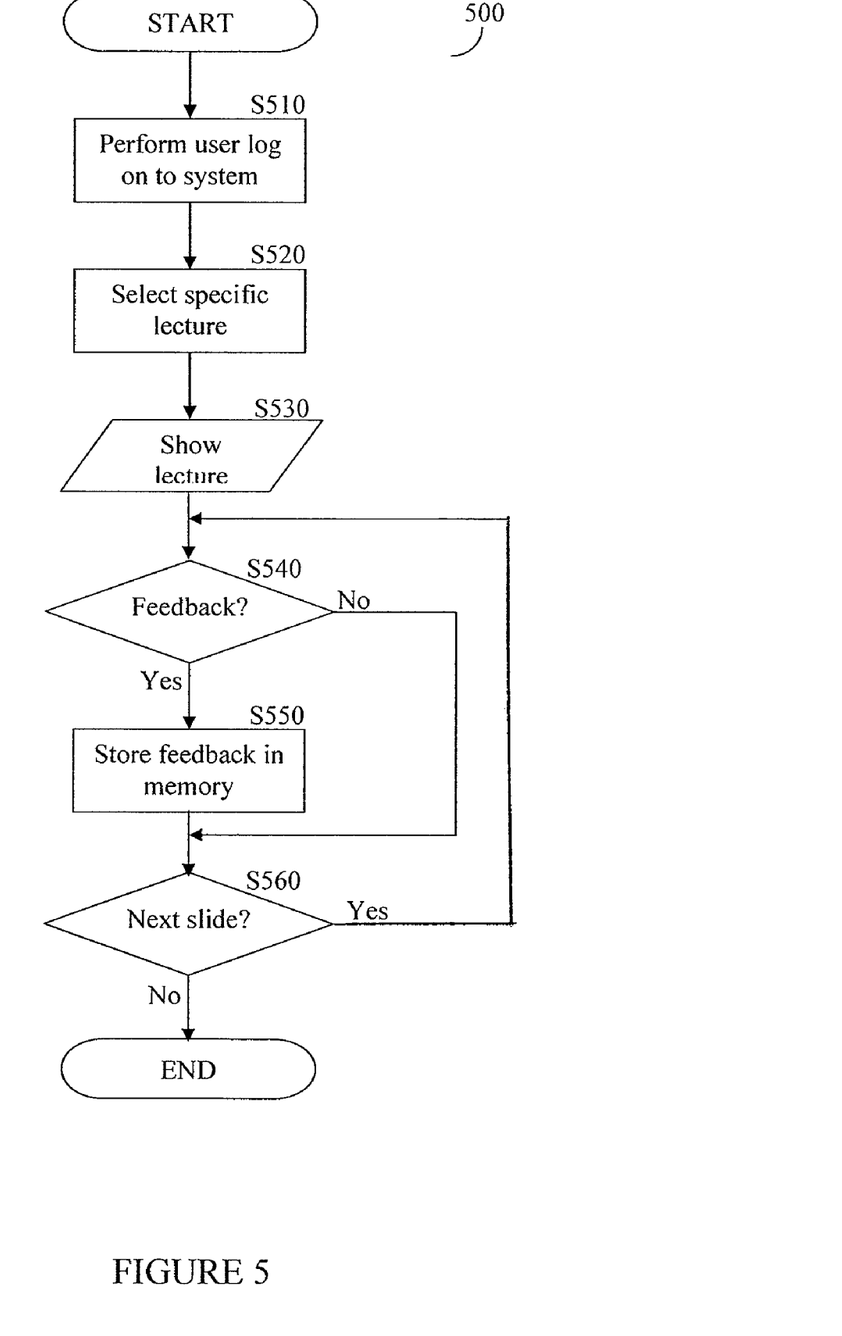
FIG. 5 is a flowchart showing the insertion of feedback unique to a student corresponding to a lecture tagged in according to the invention.

FIG. 5 is a flow chart 500 that shows the insertion of feedback unique to a user or specific viewer, for example a student, corresponding to a lecture tagged in accordance with the invention.

In step S510, the user, for example a student, logs on to the system.

In step S520, the user identifies the lectures from, for example, a list of lectures available to the user. In a case of a student, the list may be the list of classes to which the student is registered to attend, and their respective lectures.

In step S530, responsive to the user's selection of a lecture, for example lecture L1, the lecture is presented in sequence using the stored presentation sequence, as shown, for example, in FIG. 3.

In step S540, it is determined if the user wants to provide feedback and, if so, execution continues with step S550; otherwise, execution continues with step S560.

In step S550, the system registers the user's feedback. The user feedback may be received in connection with presentation of an overlay over the slide that allows the user to provide feedback, for example, by depressing one of a plurality of buttons, which may, for example correspond to "not understood," "review later," "repeat," "more information," and others. The user's feedback may be added to the lecture as tags of user respective metadata, for example, lecture L1. On the next review of the lecture L1 by the same user, the feedback information may be displayed to encourage the user for additional action. In one embodiment of the invention, rather than displaying the feedback buttons on the display used by the user to display the presentation, other input devices are used. For example, a user may use a mobile device, such as a cellular phone or a PDA, to communicate with the system under the user's log on identification, and then associate the feedback with the user's metadata tags as explained above. In yet another embodiment of the invention, additional information is stored, for example, information regarding student identification and lecture identification, in addition to the UID and the timestamp.

In step S460, it is determined whether to continue the viewing of the presentation and, if so, execution continues with step S540; otherwise, execution terminates.

In one embodiment of the invention the steps described in connection with FIG. 5 are performed in real-time, i.e. as the lecture takes place. When using a registered annotation device, such a PDA, a cellular phone, or other mobile devices that are enabled to communicate with the system, the user is identified by the system. A lecturer's schedule is available on the system and therefore a unique identification between the lecturer and a lecture is determined by the system. Similarly, with respect to a student, the student's schedule is available for access by the system and therefore, when a user provides a feedback as discussed with respect to FIG. 5, the user is uniquely identified with respect to the user's schedule and the specific lecture attended by the student. Therefore, any real-time feedback provided can be tagged with respect to the correct presentation.

In yet another embodiment of the invention, the publisher of a textbook can include homework accessible to a user via means of tangible computer readable medium. The homework may include one or more questions that are tagged with metadata that contains the UIDs of the slides that teach the topics covered by the specific question. For example, a question Q1 may have the UIDs of slide 5, slide 7, and slide 12. A user having difficulty in answering the question may request a review of the slides respective of Q1 and be presented with these slides in this predetermined sequence.

The invention may be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware, such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Figure 6:
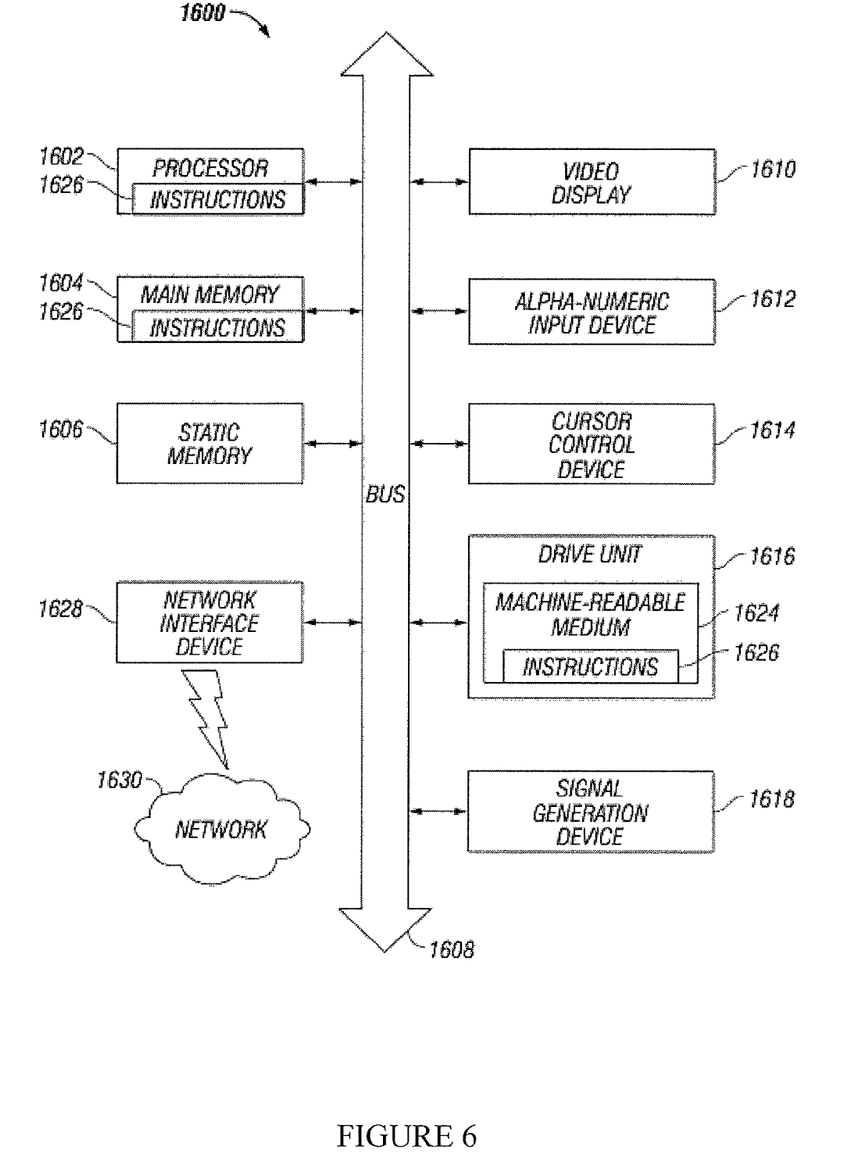
FIG. 6 is a block schematic diagram of a machine in the exemplary form of a computer system within which a set of instructions may be programmed to cause the machine to execute the logic steps of FIGS. 4 and 5 according to the invention.

FIG. 6 is a block schematic diagram of a machine in the exemplary form of a computer system 1600 within which a set of instructions may be programmed to cause the machine to execute the logic steps of FIGS. 4 and 5 according to the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method comprising:
using a computer including a processor and a memory to enable a first lecturer to (i) access a first tangible computer readable medium storing a presentation including slides containing content associated with a textbook, wherein each slide of the presentation stored in the first tangible computer readable medium has a unique identification (UID) that uniquely identifies the slide relative to any other slide of the presentation and is coded as part of the metadata of the slide, (ii) select one or more of the slides of the presentation for presentation during a first lecture, and (iii) present the selected slides during the first lecture;
using the computer to register in the memory a first lecture sequence comprising (i) the UID of each of the slides presented during the first lecture and (ii) for each of the slides presented during the first lecture, a timestamp identifying a time at which said slide was presented during the first lecture; and using the computer to enable a first user to, based on the first lecture sequence, view the slides presented during the first lecture in the order in which the slides presented during the first lecture were presented;

wherein the tangible computer readable medium additionally stores a second presentation including slides containing content associated with a second textbook, wherein each slide of the second presentation has a unique identification (UID) that uniquely identifies the slide relative to any other slide of (i) the presentation and (ii) the second presentation, and the method further comprises: using the computer to enable the first lecturer to select the presentation or the second presentation;

using the computer to enable a second lecturer to (i) access the first tangible computer readable medium, (ii) select one or more of the slides of the presentation for presentation during a second lecture, and (iii) present the selected slides during the second lecture;

using the computer to register in the memory a second lecture sequence comprising (i) the UID of each of the slides presented during the second lecture and (ii) for each of the slides presented during the second lecture, a timestamp identifying a time at which the slide was presented during the second lecture; and using the computer to enable a second user to, based on the second lecture sequence, view the slides presented during the second lecture in the order in which the slides presented during the second lecture were presented;

wherein the one or more slides of the presentation selected by the first lecturer for presentation during the first lecture include a first slide, the first lecture sequence includes the UID of the first slide, the one or more slides of the presentation selected by the second lecturer for presentation during the second lecture include the first slide, and the second lecture sequence includes the UID of the first slide; and wherein the one or more slides of the presentation selected by the first lecturer for presentation during the first lecture include a second slide, the first lecture sequence includes the UID of the second slide, the one or more slides of the presentation selected by the second lecturer for presentation during the second lecture does not include the second slide, and the second lecture sequence does not include the UID of the second slide.

2. The method of claim 1, further comprising:
using the computer to enable the first lecturer to determine a sequence of presentation of the selected slides of the presentation prior to presenting the selected slides during the first lecture; and
using the computer to store the determined sequence of the selected slides.

3. The method of claim 1, further comprising using the computer to associate said first lecture sequence with any of an audio track and a video track.

4. The method of claim 1, further comprising:
using the computer to provide the first user with access to a second tangible computer readable medium storing material associated with the textbook, wherein the material is tagged with metadata containing the UID(s) of one or more slides of the presentation;
using the computer to receive a request from the first user to view the one or more slides of the presentation uniquely identified by the UID(s) contained in the metadata with which the material is tagged; and
using the computer to enable the first user to view the one or more slides of the presentation uniquely identified by the UID(s) contained in the metadata with which the material is tagged.

5. The method of claim 4, wherein the material associated with the textbook is homework.

6. The method of claim 5, wherein the homework includes one or more questions tagged with metadata containing the UID(s) of one or more slides of the presentation.

7. A computerized system comprising:
a memory; and
a processor configured to:
(a) enable a first lecturer to (i) access a tangible computer readable medium storing a presentation including slides containing content associated with a textbook, wherein each slide of the presentation stored in the tangible computer readable medium has a unique identification (UID) that uniquely identifies the slide relative to any other slide of the presentation and is coded as part of the metadata of the slide, (ii) select one or more of the slides of the presentation for presentation during a first lecture, and (iii) present the selected slides during the first lecture;
(b) register in the memory a first lecture sequence comprising (i) the UID of each of the slides presented during the first lecture and (ii) for each of the slides presented during the first lecture, a timestamp identifying a time at which the slide was presented during the first lecture; and
(c) enable a first user to, based on the first lecture sequence, view the slides presented during the first lecture in the order in which the slides presented during the first lecture were presented;
wherein the tangible computer readable medium additionally stores a second presentation including slides containing content associated with a second textbook, wherein each slide of the second presentation has a unique identification (UID) that uniquely identifies the slide relative to any other slide of (i) the presentation and (ii) the second presentation, and
the processor is further configured to:
(d) enable the first lecturer to select the presentation or the second presentation;
(e) enable a second lecturer to (i) access the tangible computer readable medium, (ii) select one or more of the slides of the presentation for presentation during a second lecture, and (iii) present the selected slides during the second lecture;
(f) register in the memory a second lecture sequence comprising (i) the UID of each of the slides presented during the second lecture and (ii) for each of the slides presented during the second lecture, a timestamp identifying a time at which the slide was presented during the second lecture; and
(g) enable a second user to, based on the second lecture sequence, view the slides presented during the second lecture in the order in which the slides presented during the second lecture were presented;
wherein the one or more slides of the presentation selected by the first lecturer for presentation during the first lecture include a first slide, the first lecture sequence includes the UID of the first slide, the one or more slides of the presentation selected by the second lecturer for presentation during the second lecture include the first slide, and the second lecture sequence includes the UID of the first slide; and wherein the one or more slides of the presentation selected by the first lecturer for presentation during the first lecture include a second slide, the first lecture sequence includes the UID of the second slide, the one or more slides of the presentation selected by the second lecturer for presentation during the second lecture does not include the second slide, and the second lecture sequence does not include the UID of the second slide.

8. The computerized system of claim 7, wherein the processor is further configured to:

provide the first user with access to a second tangible computer readable medium storing material associated with the textbook, wherein the material is tagged with metadata containing the UID(s) of one or more slides of the presentation;

receive a request from the first user to view the one or more slides of the presentation uniquely identified by the UID(s) contained in the metadata with which the material is tagged; and enable the first user to view the one or more slides of the presentation uniquely identified by the UID(s) contained in the metadata with which the material is tagged.

9. The computerized system of claim 8, wherein the material associated with the textbook is homework.

10. The computerized system of claim 9, wherein the homework includes one or more questions tagged with metadata containing the UID(s) of one or more slides of the presentation.

11. The computerized system of claim 7, wherein the processor is further configured to:

enable the first lecturer to determine a sequence of presentation of the selected slides prior to presenting the selected slides during the first lecture; and store the determined sequence of the selected slides.

12. The computerized system of claim 7, wherein the processor is further configured to associate said first lecture sequence with any of an audio track and a video track.

\* \* \* \* \*